United States Patent
Juntunen et al.

(10) Patent No.: US 6,772,018 B2
(45) Date of Patent: Aug. 3, 2004

(54) CONTROL SYSTEM APPARATUS AND METHOD USING A CONTROLLED DEVICE FOR MANUAL DATA ENTRY

(75) Inventors: Robert D. Juntunen, Minnetonka, MN (US); James I. Bartels, Hudson, WI (US); Scott P. O'Leary, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 313 days.

(21) Appl. No.: 09/897,590

(22) Filed: Jul. 2, 2001

(65) Prior Publication Data

US 2003/0018398 A1 Jan. 23, 2003

(51) Int. Cl.[7] .............................................. G05B 11/01
(52) U.S. Cl. .......................... 700/24; 700/27; 700/17; 700/83; 318/560; 318/561
(58) Field of Search .............................. 700/17, 24, 27, 700/42, 15, 78, 83; 318/778, 560, 561

(56) References Cited

U.S. PATENT DOCUMENTS

| | | | | |
|---|---|---|---|---|
| 4,357,665 A | * | 11/1982 | Korff ......................... | 700/296 |
| 4,386,649 A | * | 6/1983 | Hines et al. ................. | 165/239 |
| 4,819,714 A | * | 4/1989 | Otsuka et al. ............... | 165/217 |
| 4,997,029 A | * | 3/1991 | Otsuka et al. ............... | 165/209 |
| 5,034,671 A | | 7/1991 | Patton et al. ................ | 318/560 |
| 5,265,004 A | * | 11/1993 | Schultz et al. ................ | 700/22 |
| 5,321,603 A | * | 6/1994 | Schwenke ..................... | 700/17 |
| 5,512,809 A | * | 4/1996 | Banks et al. ................. | 318/778 |
| 6,175,207 B1 | | 1/2001 | Melcher et al. ............. | 318/661 |

* cited by examiner

Primary Examiner—Ramesh Patel
Assistant Examiner—Joshua C Liu

(57) ABSTRACT

A system for commissioning a controller accepts a different manual input during each of several different phases of the installation and provides the installer with a different detectable cue during each phase. The installer provides the manual input and then operates a switch indicating the input is present. The system stores the manual input present and advances the system to the next phase, and in a preferred embodiment provides a visible cue identifying each phase. The preferred embodiment uses devices controlled by the controller during normal operation and which also have manual position adjustment or set point selection to provide the manual inputs.

16 Claims, 5 Drawing Sheets

CONTROL SYSTEM APPARATUS AND METHOD USING A CONTROLLED DEVICE FOR MANUAL DATA ENTRY

BACKGROUND OF THE INVENTION

Manufacturers ship certain types of systems for controlling devices in an "unprogrammed" or "uncommissioned" state. That is, until the control system has been commissioned or programmed after installation, it will not function to properly control the device it is intended to control. The main reason for this is that many classes of controlled devices have such a large number of unique configurations or requirements that it is not possible to provide a preprogrammed control system for each possible configuration.

To deal with this situation, various methods for programming or commissioning such control systems during installation have been developed. Where the control system is electromechanical, programming can be as simple as positioning cams or stops appropriately. A very simple example of such a system is any of the light/appliance timers available at hardware stores. The user positions or activates cams or levers on a dial face of the timer to select the on and off times. Although very simple, this example is typical of many types of controller programming.

Where the control system is electronic, one needs a different approach. It is easy to provide these systems with one or more control switches for reset, startup, error or status readout, etc. and one or more indicator lights that signal mode, status, error, etc. These switches can be used for commissioning or programming these systems. U.S. Pat. No. 6,175,207 teaches one type of controller using an already present reset switch to select one of a number of preprogrammed operating modes as the one for the particular installation. Other systems have dedicated switches for programming input. It is possible to provide a standard keypad such as on a calculator, but this occupies scarce space, adds cost and tempts users to alter settings that an installer had previously recorded.

It is important in some applications to prevent reprogramming of control systems after initial programming. One of these situations (and the one concerning the inventors) involves the use of a mechanical actuator as the control device for opening, modulating, and (most importantly) closing a fuel valve of a burner. The mechanical actuator is controlled by an electronic controller that receives sensor data and commands from higher-level controllers or even users. A typical actuator can operate the fuel valve between closed and maximum openings with a smaller modulation range between closed and maximum which is active during the Run phase of the burner. Once the fuel control system has been professionally installed and configured, it is important that the user does not alter these installed settings for the fuel valve actuator. However, experience shows that one cannot rely on users to follow this rule. It is possible that user tampering with these settings can inadvertently create an unsafe or inefficient operating mode for the fuel control system.

User tampering is a serious concern for manufacturers of safety-related equipment of all types. On the one hand, users and manufacturers alike strongly desire that equipment shipped in an uncommissioned state be easily commissioned during installation. On the other hand, it is very important that tampering by unqualified persons with installed system settings be made as difficult as possible. Thus, conventional input devices like keypads and other easily accessible switches are undesirable because they make tampering too easy. In our system we reduce the temptation to tamper by making access to the setting controls difficult. It is also possible to require special key codes to put the control system in its commissioning mode, but for this particular application we prefer to control access to the commissioning switches.

It is also helpful in understanding the invention, to know the basics of electromechanical actuator design. An actuator typically has a small, relatively high-speed reversible motor driving a rotating output shaft or hub of some kind through a high-ratio reduction gear train. Typically though not always, the output shaft rotates through a fraction of a revolution over a period of several tens of seconds. Maximum rotation in each direction is limited by mechanical stops. The motor drives the gear train through a magnetic slip clutch that allows the motor to rotate without harm if the output shaft is locked for any reason. Actuators are for the most part of two types, foot-mounted and direct coupled. Foot-mounted actuators are bolted to a frame of some type, and have a shaft that connects to the controlled device's input. Direct-coupled actuators have a rotating hub with a connection feature of some type such as a square or splined hole. The controlled device's shaft clamps to the actuator hub, and then the actuator housing is bolted at a single point to the controlled device itself. These two attachments cooperate to hold the actuator in its operating position.

Where modulation of the actuator position is required, it is usually necessary to sense the angular position of the actuator output. This can be done in a variety of ways. One common system uses a variable rheostat connected to the actuator output shaft. The rheostat provides a current signal varying from 4–20 ma. nominal as the shaft rotates from one mechanical stop to the other. This varying current can be converted to a quite accurate digital indication of the shaft position. The controller uses the position signal to determine the shaft position and to provide the appropriate control signal. Actuators often have manual controls that allow a human to set a desired position, overriding any controller setting of the actuator position.

BRIEF DESCRIPTION OF THE INVENTION

We have developed a system that permits easy commissioning of electrically or electronically controlled devices having status or position sensors and manual override of normal position control. Mechanical actuators having shaft position sensors and permitting manual positioning fall in this category. For purposes of commissioning, such a controlled device can be considered a manual input data source, by virtue of the position sensor output and the manual control. Then the system can be considered a data entry system for accepting manually generated data values.

In its broadest form, such a system comprises first and second data entry elements respectively providing first and second data entry signals responsive to a manual input applied to the respective data entry element. The first data entry signal typically encodes a single binary digit provided by a momentary contact switch, although this need not be. The second data entry element provides a signal encoding a plurality of data values such as those provided by a position sensor for a manually positionable device.

The system also includes a phase index memory element providing a phase signal sequentially encoding at least first and second distinct phase index values. The phase index memory element sequences the phase index values in the phase signal from the first and following phase index values to the next in order responsive to each first data entry signal. Most conveniently, a phase index can be a sequence of integers, say from one to five or any other desirable range.

An indicator element also forms a part of the system. The indicator element receives the phase signal and providing a different, humanly discernable indicator pattern for each phase index value. Finally, the system in its broadest form also includes a data recorder receiving the first and second data entry signals and the phase signal. The data recorder has at least first and second memory locations each for storing one data value. Each memory location is associated with one of the phase index values. The data recorder records the data value encoded in the second data entry signal in the memory location associated with the current value of the phase index and responsive to an occurrence of the first data entry signal.

One of the most useful embodiments uses as the second data entry element, a control element having an output element having a plurality of positions and a position sensor providing a position signal encoding the output element position. The manual input comprises an element or feature of the control element for manually positioning the output element. The preferred embodiment of the control element comprises a mechanical actuator having an output shaft forming the output element and changing position responsive to positioning power. A shaft position sensor comprises the position sensor. A manually operated switching element provides positioning power to change output shaft position responsive to operation of the switching element. Thus the element controlled by the controller also serves as its second data entry element. The installer can see or measure the shaft position, and can manually rotate the shaft to the position required.

DESCRIPTION OF THE PREFERRED EMBODIMENTS

Hardware

Figure 1:
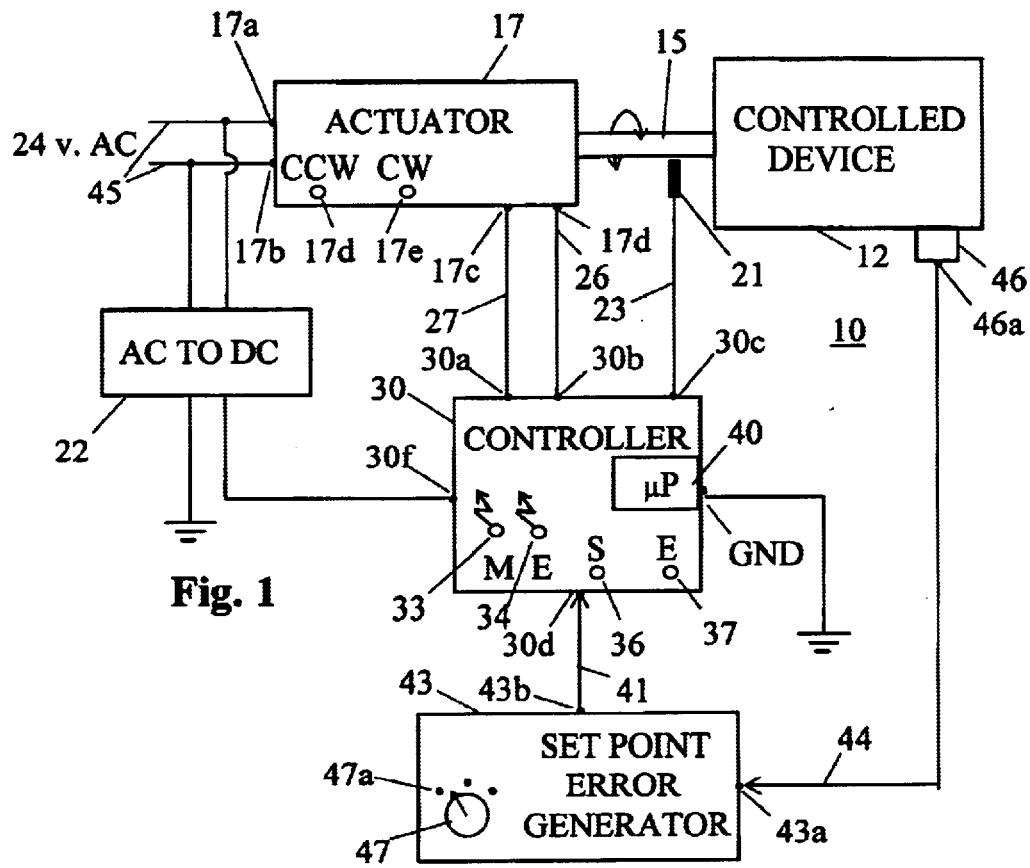
FIG. 1 is a block diagram of a system employing the invention.

FIG. 1 diagrammatically shows one possible application for the invention. The reader should realize that many other applications for employing the invention surely exist. No purpose would be served by attempting to itemize these alternatives because those familiar with control systems can easily transform the teachings below into these alternative applications. Further, such itemizing would properly subject this description to criticism for prolixity.

System 10 of FIG. 1 includes a rotary actuator 17 that drives a controlled device 12 through a rotating shaft 15. The curved double arrow around shaft 15 indicates that the shaft can rotate in both clockwise and counterclockwise directions. As previously mentioned, device 12 may be a valve for controlling flow of a fluid such as a fuel, or a damper for controlling air flow. In the particular embodiment for which the invention was developed, it is desirable to have full open and closed device positions, and between them a modulating position range.

Actuator 17 receives 24 v. AC operating power on conductors 45 at power terminals 17a and 17b. Switches controlled by manually operable pushbuttons 17d and 17e allow shaft 15 to be driven by the AC power in the indicated counterclockwise and clockwise directions respectively when these are manually operated. Actuator 17 can also be controlled to drive shaft 15 in either the clockwise or counterclockwise direction depending on a control signal applied to control terminals 17c and 17d through paths 26 and 27. This is well known in the industry, and no further notice need be taken of it.

A position sensor 21 senses the angular position of shaft 15. In a typical arrangement, sensor 21 is incorporated into actuator 17 directly, and may be of the type providing a current signal varying from 4–20 ma. as shaft 15 moves from a minimum to a maximum angular position. One should note that actuator 17 is usually designed or selected to have the capability to operate shaft 15 through a greater range of motion than is necessary to properly control the operation of device 12. Further, the desired or needed range of actuator 17 motion differs from installation to installation.

Actuator 17 and its pushbuttons 17d and 17e, shaft 15, and sensor 21 together may be considered to comprise a data entry element. The signal provided by sensor 21 can have a plurality of data values dependent on position of shaft 15, as controlled by the manual operation of the buttons 17d and 17e (and of course also on the control signals provided by a controller 30). Thus buttons 17d and 17e can control the data provided by sensor 21 on path 23.

Controlled device 12 can be any of a number of flow control or heat-generating elements such as a valve, damper, furnace, fan etc. A condition sensor 46 provides a condition signal at a terminal 46a encoding or indicating the level or value of a condition controlled by device 12. Path 44 carries the condition signal provided by sensor 46. Sensor 46 may measure temperature if device 12 is an HVAC device of some kind, or pressure if device 12 is a valve. The condition signal thus provides a direct indication of the effects resulting from the position of shaft 15, as well as external effects produced by such things as air infiltration into a room, outside temperature changes, supply pressure variation, etc. The condition signal can then form a basis for controlling the position of shaft 15.

A set point error generator 43 receives at an input terminal 43a the condition signal provided by sensor 46 on a path 44. Error generator 43 can for example have a manually adjustable dial or knob 47 for selecting a set point level or value indicated on a scale 47a. A thermostat is a common example of one type of error generator 43 using either the dial 47 and scale 47a shown or a keypad as done on electronic thermostats, to allow user control of the set point value. In the case of a thermostat, sensor 46 will be a temperature sensor of some kind. Error generator 43 provides a digital error signal at an output terminal 43b to a path 41 indicating existence of a difference and perhaps the magnitude of the difference as well between the sensed condition value encoded in the condition signal and the set point value selected by the user. Error generator 43 provides proportional control, with the error signal on path 41 encoding a value that can vary in magnitude between preselected minimum and maximum end point values. Each value that the error signal assumes corresponds to a particular position of shaft 15. One feature of this invention allows the user to correlate the two end point values of the error signal with minimum and maximum positions of shaft 15 defining the proportional band within which actuator 17 can control device 12. These proportional band minimum and maximum shaft 15 positions are usually within the minimum and maximum excursions allowed by controller 30 for shaft 15.

Error generator 43 also can serve as a data input device that can be correlated with data provided by positioning of actuator 17. We accomplish this by turning the dial 47 to indicate either the minimum or maximum setting, which specifies the minimum or maximum end point value for the error signal. Once these values have been loaded into memory 70*b*, interpolation between these values and the corresponding minimum and maximum shaft 15 settings allows microprocessor 40 to precisely adjust the position of shaft 15.

An AC to DC converter 22 provides DC operating power between a power terminal 30*f* of controller 30 and a ground terminal GND. Controller 30 will be described in more detail below, but typically includes a small microprocessor 40, and in this example, a few simple external components. Controller 30 has a number of communication terminals, typically I/O terminals of microprocessor 40, of which terminals 30*a* and 30*b* provide output signals and terminals 30*c* and 30*d* receive input signals. Terminals 30*a* and 30*b* provide control signals to actuator 17 on paths 26 and 27. Terminal 30*c* receives the sensor signal on path 23, and terminal 30*d* receives a signal on path 41 from the set point error generator 43. Of course, a controller 30 may have many more input and output terminals than that shown. Again, this is well within the level of skill that those familiar with this technology have. These communication terminals may be a part of microprocessor 40, or may be separate, perhaps relay-controlled switches.

Controller 30 has rudimentary features allowing communication with humans. Save (S) and erase (E) pushbutton switches 36 and 37 allow a human to provide data to controller 30. Mode (M) indicator element 33 and error (E) indicator element 34 allow controller 30 to communicate to a human. Indicator elements 33 and 34 typically are simple LEDs driven by microprocessor 40 through output terminals, not shown in FIG. 1. These switches 36 and 37 and indicator elements 33 and 34 have specific purposes in implementing the invention, and typically have other purposes once the invention has been operated the one time intended during system setup. The commercial embodiment of the invention includes sensing of switch 36 and 37 closings using so-called "debounce" logic, but this is not a specific feature of the invention. Where a switch 36 or 37 is stated to be closed, this means nothing more than the state of the switch has been sampled a number of times over a period of a few seconds and has been found to be closed for a large percentage of those sampling events. The system may provide a unique indication such as a rapid flash from one of the elements 33 and 34 when a switch 36 or 37 is first sensed as closed, and then a solid indication once the sampling period is over. This procedure is not specific to the invention either.

Figure 2:
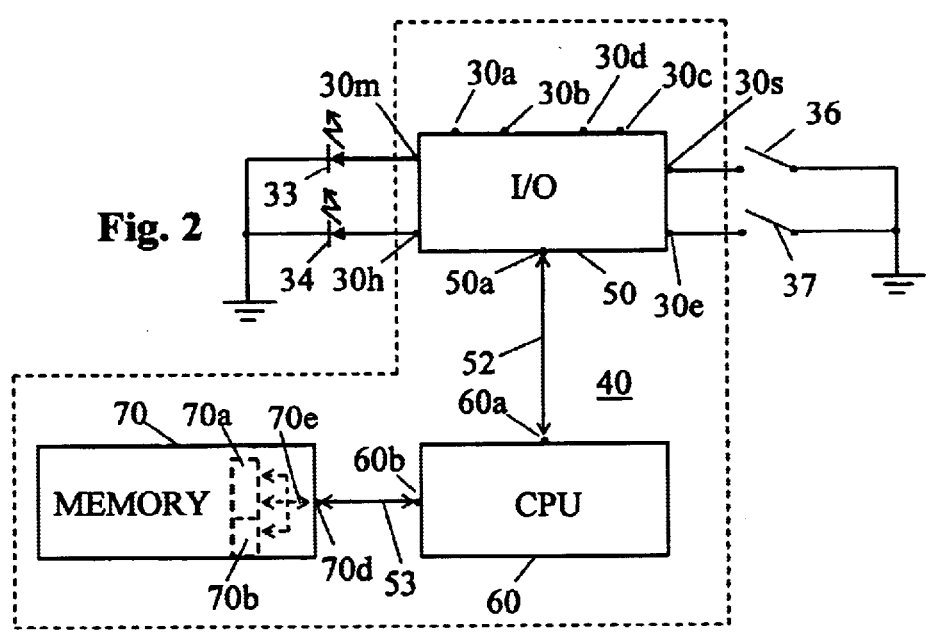
FIG. 2 is a block diagram showing details of hardware elements used in implementing the invention.

FIG. 2 shows a part of controller 30 in greater detail. As mentioned, controller 30 typically includes a microprocessor 40 of some type. These microprocessors invariably include a CPU 60, an I/O (input/output) section 50, and a memory 70. CPU 60 communicates with memory 70 through a data bus 53 connected between CPU terminal 60*b* and memory terminal 70*d*. CPU 60 communicates with I/O section 50 through a bus 52 connected between internal CPU terminal 60*a* and I/O section terminal 50*a*. In addition, I/O section 50 is shown with input terminals 30*s* and 30*e* respectively connected to the switches 36 and 37. Switches 36 and 37 are connected so that when closed, they ground their respective I/O section terminals 30*s* and 30*e*. Alternatively, switches 36 and 37 may connect the respective I/O terminal to a positive or negative logic voltage rather than ground. Switches 36 and 37 comprise data entry elements for entering data into controller 30. Of course, the ground or non-zero logic voltage source must include any required pull-up or pull-down resistor.

I/O section 50 also has output terminals 30*m* and 30*h* for operating LEDs 33 and 34. A typical LED 33 or 34 can be driven to emit visible light with only a few ma. of current, which is well within the current available from most microprocessor output terminals. The other input and output terminals shown in FIG. 1 are shown in FIG. 2 as well, and serve the previously indicated functions.

Memory 70 represents the ROM or PROM storing the instructions executed by CPU 60 as well as the EEPROM 70*b* (electrically erasable PROM) and RAM 70*a* in which CPU 60 stores operands and data used or generated by instruction execution. EEPROM 70*b* can be read as quickly as conventional RAM 70*a* or PROM, but is written orders of magnitude more slowly. Accordingly, it is customary to use RAM 70*a* for storing values being calculated for EEPROM 70*b* and after calculations have been completed, write the data to EEPROM 70*b*. To assure that this data transfers accurately, it is customary to uses cyclic redundancy check (CRC) testing of transferred data. Some of this CRC activity will be shown in the software flow charts, but does not really form a part of the invention.

The various parameters whose loading forms the commissioning process are stored in EEPROM 70*b* when the commissioning process is complete. It is convenient to consider RAM 70*a* and EEPROM 70*b* to provide signals representing particular parameters. For example the signal from EEPROM 70*b* encoding the phase index value can be considered to be a phase index signal.

The chip carrying a typical microprocessor 40 includes some on-board RAM and EEPROM. If this memory is inadequate, additional EEPROM may be located in a separate memory module. Since this is well understood by those familiar with this technology, it is easiest to simply show a separate memory module 70 representing both the memory on-board microprocessor 40 as well as any external memory needed. Memory 70 is shown as including particular RAM locations 70*a* and EEPROM locations 70*b* that serve as memory storage for implementing the invention. These memory locations specifically involved with the invention will be identified while explaining the flowcharts of FIGS. 3–8. An internal memory bus 70*e* carries data between a bus terminal 70*d* and the internal memory locations. Addressing hardware, not shown, routes the data between terminal 70*d* and the individual memory locations.

Software Introduction

The flowcharts of FIGS. 3–8 represent software instructions whose execution by CPU 60 transform controller 30 into apparatus that implements the invention. Those familiar with software design realize that first, software does in fact have a specific physical existence within the memory holding it and within the data processor or CPU 60 that executes the software, and second, that the CPU itself becomes a functional hardware element performing the programmed function while executing the software intended for that purpose. As to the first point, the instructions held in memory 70 have a physical structure that incorporates the unique combination of software instructions loaded into and readable from memory 70 and thereby uniquely defines its own structure by the physical characteristics of a memory holding the instructions. As to the second point, while the CPU 60 is executing the instructions for any particular function, the CPU becomes for that short period of time a physical functional element performing that function. As instruction execution continues, CPU 60 successively becomes the physical embodiment of each of the functional elements intended by the programmer and defined by the flow charts. As a set of instructions for a particular function is re-executed, the processor can become that functional element as many times as is required. From this standpoint one can easily realize that a properly programmed data processor is a physical device in which an invention is physically implemented. A microprocessor type of data processor implementation is often preferred to discrete or special purpose hardware because of cost savings to produce, relatively easy development, and easy modification and upgrade.

It is useful to generally discuss the flowcharts of FIGS. 3–8 and the three types of symbol boxes in them. These flowcharts describe the functions of software stored in memory 70 of FIG. 2 and which implements various functions of controller 30 including those of the invention. Each symbol box represents one or more CPU 60 instructions. The lines with arrowheads connecting the boxes signify the order in which the instructions symbolized by the boxes are to be executed, with the flow of instruction execution following the direction of the arrowheads. Each box has a short verbal description of the function performed by the instructions represented.

Figure 3:
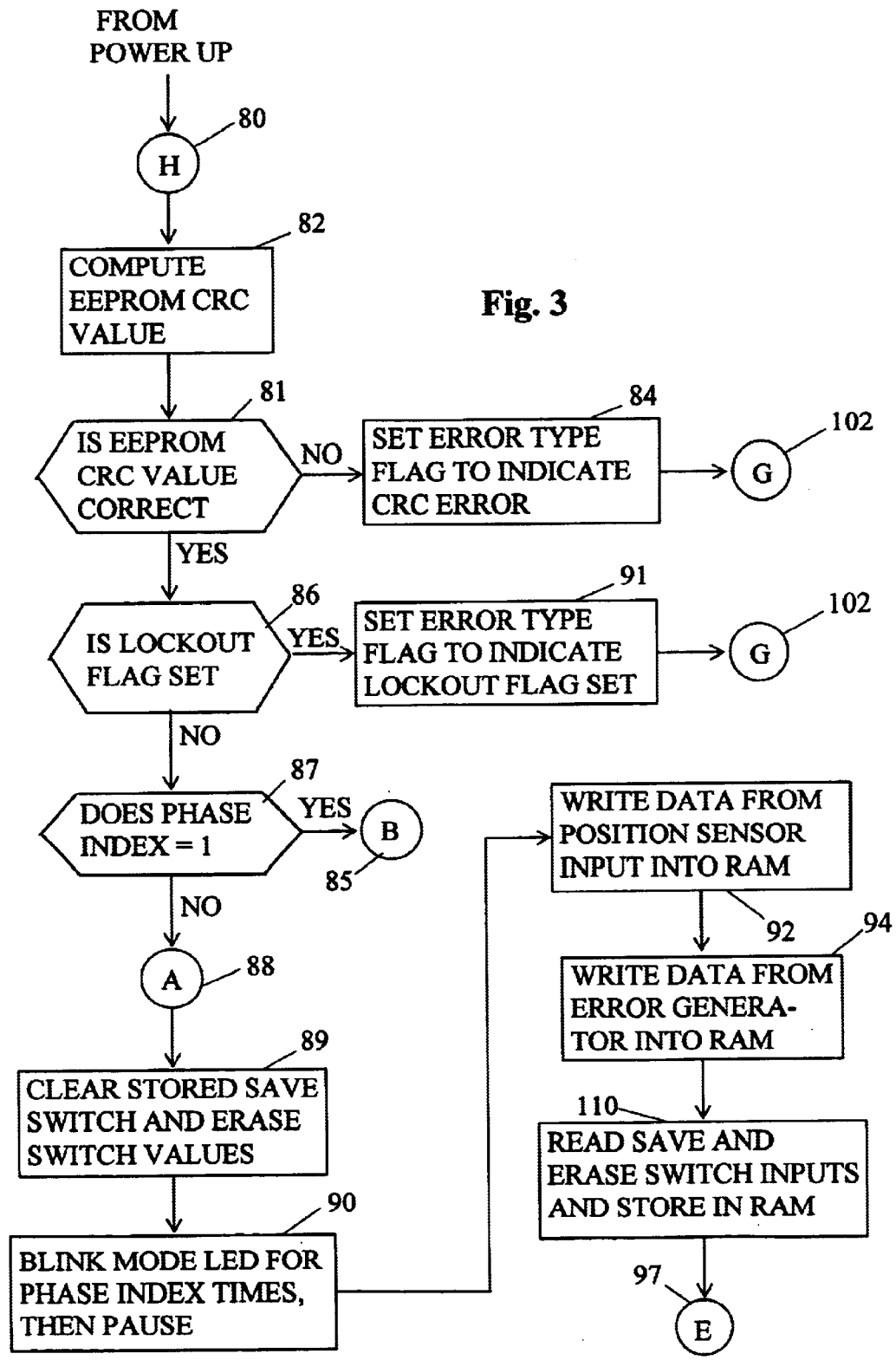
FIGS. 3–8 together form a flowchart of software instructions which when executed by the microprocessor shown in FIGS. 1 and 2 convert the microprocessor and its accessories into the invention.

Rectangular boxes such as element 82 of FIG. 3 are activity (as opposed to decision) elements. Activity elements define some type of computational operation or data manipulation, such as an arithmetic operation or data transfer. Hexagonal boxes as at 81 of FIG. 3 are decision elements and have two paths labeled "YES" and "NO" from them to two further symbol boxes. Decision element instructions test or detect some mathematical or logical characteristic or condition. Depending on the test result, instruction execution can either continue in sequence or take a path to another symbol box specified by the results of that test. A decision element also symbolizes execution by CPU 60 of one or more instructions testing the specified condition or arithmetic or logical value indicated and causing instruction execution to branch depending on the result of that test.

Lastly, circles comprising connector elements as at 80 of FIG. 3 imply continuity of instruction execution between the same connector elements located at different points in the instruction sequence without direct connection between them by lines with arrowheads. That is, instruction execution continues from a connector element having a particular alphabetic definer into which an arrow enters (of which there may be several), to the identical connector element from which an arrow exits (of which there will be only one), as for connector element A 88. The letter in the circle designates the connector elements at which instruction execution ends and at which execution continues.

As explained above, the instructions that an activity or decision element symbolizes cause the data processor to become during execution of those instructions, the functional equivalent of a physical device that performs the stated function. Of course each functional element exists for only a short time, and during this time none of the other elements exist. However, nothing in the patent law requires all of the components of an embodiment described in a patent to simultaneously exist. Accordingly, one can describe and claim the invention using terms of art or functional terms describing these physical devices with reference to their implementing software.

Note there may be many different specific embodiments for these physical devices within CPU 60 that all provide identical functionality. We wish to include all of these possible different embodiments in the definition of our invention, and by no means limit ourselves to that shown in the flowcharts of FIGS. 3–8.

Software Description

When power is first applied to the microprocessor 40, internal circuitry directs instruction execution to connector element 80 and the immediately following activity element 82 in FIG. 3. Typical microprocessors are designed to start instruction execution at a prearranged instruction address after DC power is applied across terminals GND and 30*f*, and connector element H 80 symbolizes the power-on execution address.

As a general rule, to assure accurate operation of memory 70 a CRC (cyclic redundancy code) value is computed for all of the data recorded in EEPROM 70*b* each time values in EEPROM 70*b* are changed. This newly calculated value is then stored in EEPROM 70*b*. The CRC value is then immediately recomputed and the result of the second computation compared with the value stored for the first computation. If the two computational results are identical it is very likely that the data in EEPROM 70*b* can be read accurately. If values in RAM 70*a* are block transferred to EEPROM 70*b*, then the CRC can be computed and compared for each of the RAM and EEPROM blocks of data, or the RAM and EEPROM values can be compared on a byte-by-byte basis. Further, on each power-up, the CRC value is recomputed and tested against the stored CRC value to assure proper operation of EEPROM 70*b*. Activity element 82 and decision element 81 test EEPROM 70*b* by recomputing a CRC value for the contents of EEPROM 70*b* and then testing the recomputed value against the CRC value stored in EEPROM 70*b*. If the recomputed and stored values of the CRC are not equal, then execution transfers to the instructions of activity element 84 which set a lockout flag to indicate some type of system failure. The activity element 84 instructions also set an error type flag the indicates the type of failure detected, and instruction execution then branches through connector element G 102 to activity element 129 (FIG. 6) which sets a lockout flag and then continues to other activity elements that return the controlled device 12 to a safe configuration (fuel valves closed, etc.) and indicate the type of error. The set lockout is tested at appropriate points in the execution of the software by the controller 10 to prevent further operation pending human intervention. In general any type of detected error that raises the question of proper operation of microprocessor 40 will cause the lockout flag to be set by transferring execution to element 129.

If the EEPROM CRC value has tested to be correct, then decision element 86 tests whether the lockout flag has been set. Detecting a set lockout flag at this point implies that the lockout flag was set earlier and then the power to controller 30 was lost. When power is then reapplied, an already set lockout flag if present is detected by element 86. The error type flag is set to an appropriate value by activity element 91 and instruction execution transfers to activity element 129 through connector element G 102.

Figure 8:
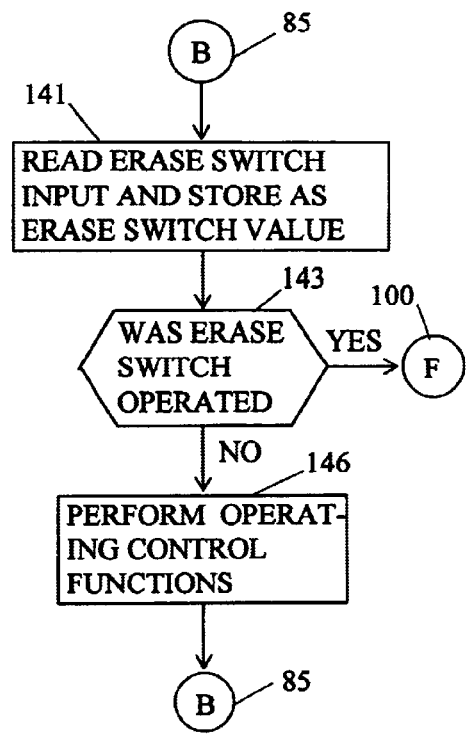

If the lockout flag is not set, then the instructions of decision element 87 are executed next. These instructions test whether a value called the phase index, about which more will soon be said, is equal to 1. If so, then no programming or commissioning of controller 30 is required, and instruction execution transfers to activity element 141 through connector element B 85 (FIG. 8). The set of instructions starting with activity element 141 is the normal operating functions loop.

If the phase index is not equal to 1, then programming or commissioning of controller 30 is required, and the execution sequence transfers through connector element A 88 to activity element 89 in FIG. 3. The main software loop for commissioning controller 30 starts with activity element 89. When the save switch 36 or the erase switch 37 is closed, software stores a value indicating that switch closure in a RAM 70a location dedicated to that switch. To be sure that these RAM 70a locations have been set to indicate at the start of this instruction sequence that the associated switches have not been closed, activity element 89 clears these save and erase switch RAM locations.

The instructions of activity element 90 are executed next, and these are the first that directly involve the phase index value. The phase index must equal some number between 5 and 1 inclusive because the software allows only these values. Values different from 1 direct instruction execution to commissioning functions, per the decision by element 87. The commercial embodiment for which this invention was developed provides for loading six different parameters provided by manually setting the shaft 15 position and the value encoded in the error signal on path 41. These parameters are related to the phase index values in Table I as follows:

TABLE I

| Phase Index | Parameter(s) |
| --- | --- |
| 5 | Maximum CW shaft 15 position |
| 4 | Maximum CCW shaft 15 position |
| 3 | Maximum CW position of shaft 15 for proportional control range, and Corresponding error signal end point value |
| 2 | Maximum CCW position of shaft 15 for proportional control range, and Corresponding error signal end point value |

Memory space 70b represents six EEPROM storage locations for semi-permanently recording the four different actuator shaft 15 positions and the two error signal values. The assignment of parameters to phase index values is of course completely arbitrary.

Executing the instruction sequence for activity element 90 causes microprocessor 40 to provide electrical current to terminal 30 m creating a visual indication of the current setup phase by blinking mode LED 33 a number of times equal to the phase index value, followed by a short pause. In one suitable embodiment, each blink comprises an ON time for mode LED 33 of 500 ms followed by a 500 ms OFF time. After a number of blinks equal to the phase index have been completed, the instruction of activity element 90 cause controller 30 to provide a further OFF time of 2 sec. This visual indication is sufficient to inform the operator precisely where (s)he is in the setup process. Other visual indication formats may be equally suitable.

After providing the visual indication of the current setup phase index value, microprocessor 40 continues by executing the instructions represented by activity element 92. These instructions convert the signal provided on path 23 by sensor 21 to a digital value, and store this digital value in a temporary location in RAM 70a. The number of blinks by the mode LED 33 prompt the installer to adjust shaft 15 to the position for the parameter specified in Table I for the current phase index value. Activity element 94 instructions then write the value encoded in the error signal on path 41 into another location of RAM 70a.

The instructions of activity element 110 sample the save switch 36 and erase switch 37 levels and store these values in preselected RAM 70a locations. If save switch 36 or erase switch 37 has been closed, a 0 v. logic level will be present at the corresponding terminal 30s or 30e. Element 110 instructions sample the save switch 36 and erase switch 37 status by sensing the voltage level at terminals 30s and 30e. To correct for the possibility of inaccurate reading, it is customary to take several samples of the status of a switch 36 or 37, and instructions that implement that practice are in fact symbolized by activity element 110.

Figure 4:
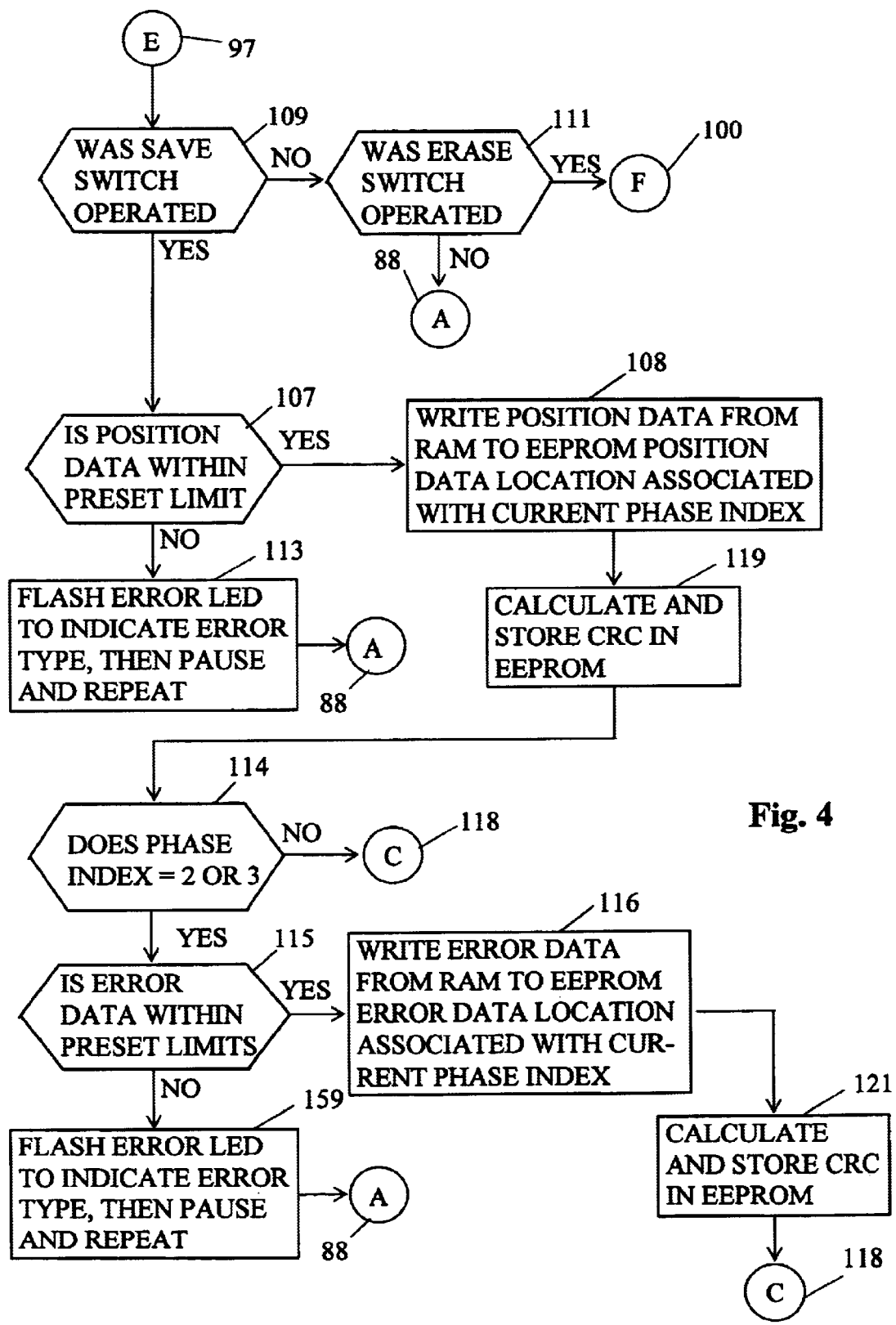

Next, instruction execution moves through connector element E 97 to the instructions of decision element 109 in FIG. 4, which tests the status of save switch 36 by testing the value of the RAM location loaded with the value indicating the voltage at terminal 30s. If switch 36 has not been operated, instruction execution moves to decision element 111. Decision element 111 tests in a similar manner if switch 37 has been operated. If not, instruction execution moves as indicated by connector element A 88 to reexecute the instructions of activity element 89 (FIG. 3). This sequence of instructions continues until either save switch 36 or erase switch 37 is operated. During this time, the operator will change the position of shaft 15 using the switches 17d and 17e to the position needed for the particular installation.

If decision element 111 senses that the erase switch 37 has been closed, the instructions of decision element 101 (FIG. 7) are executed as indicated by connector element F 100. The functions performed by the instruction sequence accessed by connector element F 100 will be discussed below. Generally, this functionality allows the installer to reenter a previously entered parameter value corresponding to a larger phase index value.

If the instructions of decision element 109 sense that save switch 36 was operated during this pass through the main loop, then instructions for activity element 107 are executed. EEPROM 70b is loaded during manufacture with a position data limit value for each of the phase index values. The activity element 107 instructions test the position data recorded in RAM 70a by the instructions of activity element 92 against the preloaded limit value assigned to the current phase index value. If the position data value recorded for the current phase index value is not within the preset limit recorded in EEPROM 70b for that phase index value, the instructions of decision element 107 continue with instruction execution at activity element 113. Element 113 instructions flash error LED 34 in a preset pattern indicating the error, pauses, and then repeats the preset pattern, to indicate visually the type of error detected. Instruction execution then returns to activity element 89 in FIG. 3 through connector element A 88.

If decision element 107 determines that the position data is acceptable, then the instructions of activity element 108 are executed next, transferring the position data from RAM 70a to the location in EEPROM 70b corresponding to the current value of the phase index. The CRC value is THEN recalculated and stored back into EEPROM 70b by the instructions of activity element 119.

Then the instructions of decision element 114 test whether the phase index value is 2 or 3. If not, then the instruction sequencing proceeds to activity element 122 (FIG. 5) through connector element C 118. If the phase index is 2 or 3, then the error data loaded into RAM 70a by activity element 94 is tested by the instructions of decision element 115 against an error data limit value preloaded into EEPROM 70b and assigned to the current phase index value. If the value is not within the preset limit, the instructions of activity element 159 are executed, which flash error LED 37 is a preset pattern to indicate this type of error. Then execution returns through connector element A 88 to the start of the main loop thereby giving the operator another chance to reenter the error data, perhaps by resetting dial 47.

As mentioned earlier, the operator should turn dial 47 to one of its extreme positions on scale 47a for each of the phase index values of 2 and 3. These settings of dial 47 will generate either a minimum or maximum error signal value, which will allow the operating program to interpolate to precisely position shaft 15 as a function of the error signal value.

If decision element 115 determined that the stored error data is within the preset limit, the instructions of activity element 116 copy the current error data from RAM 70a to the EEPROM 70b error data location corresponding to the current phase index value. The new value of the EEPROM CRC value is then calculated and stored in EEPROM 70b by the instructions of activity element 121. Then execution proceeds through connector element C 118 to the instructions of activity element 122 in FIG. 5 which subtract 1 from the phase index value.

Decision element 130 instructions then test whether the EEPROM 70b CRC is correct. If not, the instructions of activity element 132 are executed and the execution proceeds to the instructions of activity element 129 through connector element G 102. If the CRC value is found to be correct by decision element 130, then the phase index value is tested by decision element 117. If the phase index is unequal to 1, then instruction execution continues through connector element A 88 to execute the instructions of activity element 89. If the phase index equals 1, then setup is complete, and the instructions of activity element 120 are executed. The instructions of element 120 cause the mode LED 33 to slowly flash or blink to indicate completion of the setup. The instructions of activity element 141 (FIG. 8) are executed next through connector element B 85.

Figures 5, 7:
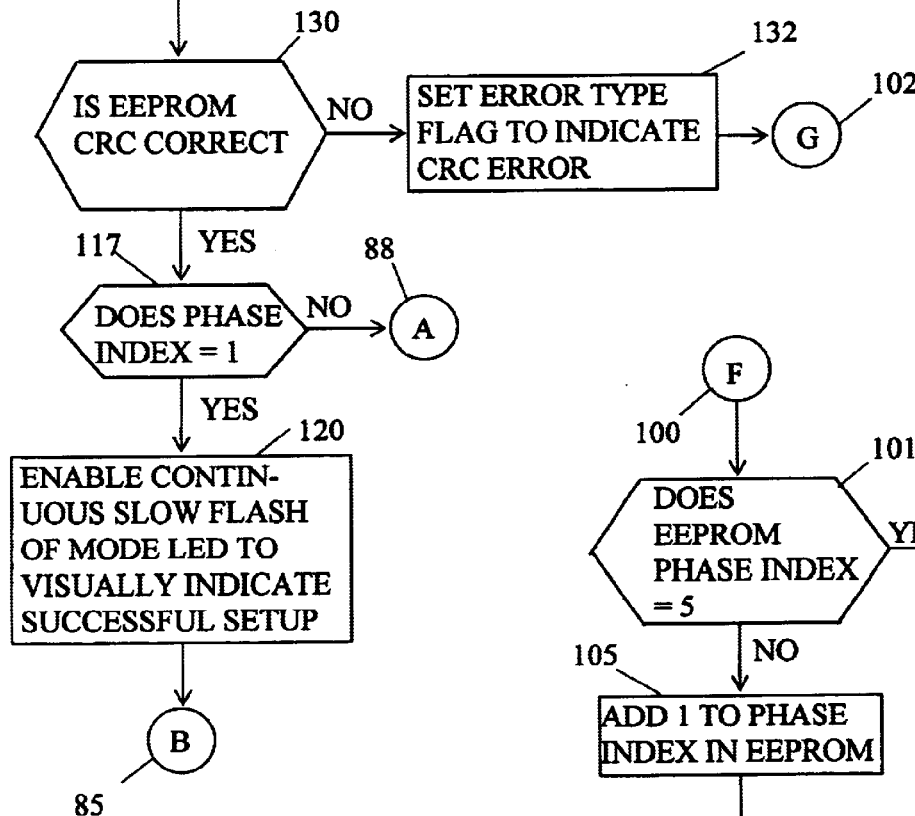

In FIG. 7, the sequence of instructions starting at connector element F 100 are used to increment the value of the phase index if the operator closes the erase switch 37. When the instructions of either decision element 111 (FIG. 4) or decision element 143 in the normal operating loop shown in FIG. 8 detect the erase switch 37 to have been closed, the decision element 101 instructions are executed. These instructions test whether the phase index is equal to 5. If not, the instructions of activity element 105 increment the phase index by one. Then in either case, the execution of instructions transfers back to the start of the main commissioning loop in FIG. 3 through connector element A 88.

Turning next to the instructions for activity element 141 in FIG. 8, these read the erase switch 37 status. The instructions of decision element 143 are executed next to determine whether erase switch 37 has been operated. If the erase switch 37 has been operated, this means that the operator has decided to change one or more of the controller 30 commissioning parameters. By repeatedly operating the erase switch 37 while in the main loop starting at connector element A 88 it is possible to continuously increment the phase index value to any of the allowable values desired. If a parameter for a phase index value different from 2 is to be changed, then each of the other values for smaller phase indexes must also be changed in the normal sequence. Since these commissioning values will be changed very rarely, this is not considered to be a significant problem.

If the erase switch has not been operated, then the instruction sequence represented by activity element 146 is executed. These are the operating control instructions for positioning the shaft 15 based on the position signal provided by sensor 21, the Table I parameters loaded into EEPROM 70b, and the error signal provided on path 41. The instructions of element 146 convert controller 30 into an operating control element.

Figure 6:
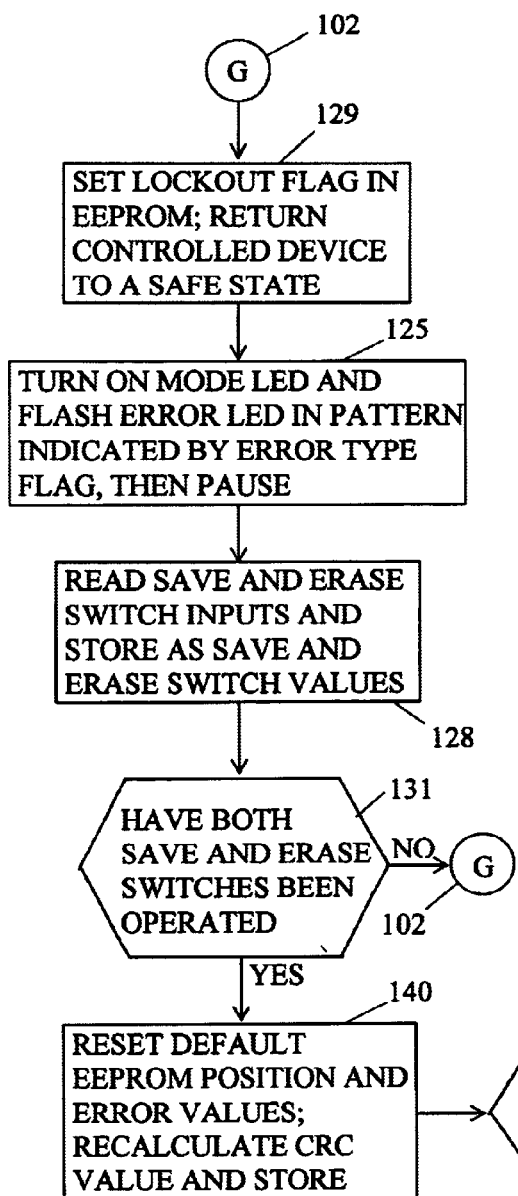

In FIG. 6, connector element G 102 starts the series of software elements that process various types of errors detected by controller 30 and requiring controlled device 12 to be returned to a safe condition. Activity element 129 represents instructions that set the lockout flag and that also return controlled device 12 to a safe state. If device 12 is a fuel valve for example, this would mean closing the valve. Then the instructions of activity element 125 are executed to cause mode LED 33 to turn on solidly and the error LED 34 to flash in a pattern dictated by the error type flag.

After that, the instructions of activity element 128 sense and store the save and erase switch 36/37 inputs in the RAM 70a locations assigned to them. Then the instructions of decision element 131 are executed, which test whether both the save switch 36 and the erase switch 37 have been closed. If not, instruction execution returns through connector element G 102 to reexecute the instruction sequence starting with activity element 129. If both the save switch 36 and the erase switch 37 have been closed the instructions of activity element 140 are executed. These instructions restore the commissioning parameters to their default values, and recalculate and store the CRC value. This new CRC value is tested to be correct by decision element 148. If it is correct, instruction execution continues through connector element A 88 to activity element 89. If not correct, executing the instructions of activity element 150 sets the error type flag, and execution then continues through connector element G 102 to activity element 129. Accordingly, one can see that any serious error requires operator intervention to push both the save and erase switches 36/37. If errors keep occurring, the operator will soon realize that the controller 30 itself is defective and install a new one.

Thus, it is possible to use a device such as an actuator 17 with a manual control mode or a manually adjustable set point error generator 43 (or both) as an input source for setting or commissioning a controller 30 for properly operating a controlled device 12 in a specific installation. This allows a controller 30 having only a very few simple elements for communicating with a human operator or installer to be manually commissioned with a substantial amount of flexibility.

We claim:

1. A data entry system for accepting manually generated data values, said system comprising:
   a) first and second data entry elements respectively providing first and second data entry signals responsive to a manual input applied to the respective data entry element, said second data entry signal encoding a plurality of data values dependent on the manual input;
   b) a phase index memory element recording an alterable phase index value;
   c) an indicator element receiving the value recorded in the phase index memory element and providing a unique, humanly discernable signal pattern for each phase index value;
   d) a phase index control element in operating relation to the phase index memory element and altering the phase index value responsive to each first data entry signal; and
   e) a data memory receiving the second data entry signals, said data memory having at least first and second memory locations each for storing a data value, and each memory location associated with one of the phase index values, said data memory recording the data value encoded in the second data entry signal in the memory location associated with the current value of the phase index recorded in the phase index memory element.

2. The system of claim 1, wherein the second data entry element comprises a control element having an output element having a plurality of positions and a position sensor providing a position signal encoding the output element position, wherein the manual input comprises an element for manually positioning the output element.

3. The system of claim 2 wherein the control element comprises a mechanical actuator having an output shaft forming the output element and changing position responsive to positioning power, a shaft position sensor comprising the position sensor, and a manually operated switching element providing positioning power to change output shaft position responsive to operation of the switching element.

4. The system of claim 3, further including an element for testing the phase index value, and responsive to a preselected phase index value, entering an operating control functions mode receiving the data values stored in the first and second memory locations.

5. The system of claim 4, wherein the phase index control element alters the value recorded in the phase index memory element by a first preselected value responsive to the first data entry signals.

6. The system of claim 5, including a third data entry element providing a third data entry signal, wherein the phase index control element alters the value recorded in the phase index memory element by a second preselected value different from the first preselected value responsive to the third data entry signal.

7. The system of claim 4, wherein the indicator element comprises
   a) a first light source providing visible light responsive to a source voltage; and
   b) a blinking control receiving the phase index value, said blinking control providing to the light source, a number of pulses of source voltage equal to the phase index value.

8. The system of claim 4, including
   a) a condition sensor providing a condition signal, said condition sensor in operative relation to a physical parameter controlled by the output shaft, and encoding in the condition signal a value dependent on the physical parameter;
   b) a set point error generator for selecting a set point value for the physical parameter, said set point error generator receiving the condition signal and providing an error signal encoding a value dependent on the difference between the set point value and the value encoded in the condition signal; and
   c) a data recorder receiving the phase index signal and responsive to a preselected value thereof, recording the value encoded in the error signal in a memory location associated with the phase index value.

9. The system of claim 2, including a
   a) a condition sensor providing a condition signal, said condition sensor in operative relation to a physical parameter controlled by the control element, and encoding in the condition signal a value dependent on the physical parameter;
   b) a set point error generator for selecting a set point value for the physical parameter, said set point error generator receiving the condition signal and providing an error signal encoding a value dependent on the difference between the set point value and the value encoded in the condition signal; and
   c) a data recorder receiving the phase index value and responsive to a preselected value thereof, recording the value encoded in the error signal in a memory location associated with the phase index value.

10. The system of claim 1, wherein the indicator element comprises
    a) a first light source providing visible light responsive to a source voltage; and
    b) a blinking control receiving the phase index value, said blinking control providing to the light source, a number of pulses of source voltage equal to the phase index value.

11. The system of claim 10, including
    a) a second light source providing visible light responsive to the source voltage; and
    b) a data test element receiving the phase index value and the second data entry signal, and providing a preselected pattern of source voltage pulses to the second light source responsive to a comparison of the value encoded in the second data entry signal with a prerecorded value dependent on the phase index value.

12. A method for operating a data entry system for accepting manually generated data values, said method including the steps of:
    a) providing first and second data entry signals responsive to a manual input applied to respective data entry elements, said second data entry signal encoding a plurality of data values dependent on the manual input;
    b) recording an alterable phase index value;
    c) receiving the recorded phase index value and providing to an indicator element a unique, humanly discernable signal pattern for each phase index value;
    d) altering the phase index value responsive to a first data entry signal; and
    e) recording in a data memory location associated with the current value of the phase index, the data value encoded in the second data entry signal.

13. The method of claim 12 further including the step of altering the phase index value by a first preselected value responsive to each of the first data entry signals.

14. The method of claim 13 further including the step of altering the phase index value by a second preselected value different from the first preselected value responsive to a third data entry signal.

15. The method of claim 14 wherein the step of providing a signal to an indicator element further includes the step of providing to a light source, a number of voltage pulses equal to the phase index value.

16. The method of claim 12 further comprising the steps of:
    a) providing a condition signal having a value specifying the state of a controlled parameter;
    b) providing a manually adjustable set point signal specifying a particular condition signal value;
    c) providing an error signal dependent on the values encoded in the set point signal and the condition signal; and
    d) adjusting the set point signal to an extreme value of the condition signal; and
    e) responsive to a preselected phase index value, recording the error signal in association with the preselected phase index value.

* * * * *